(12) United States Patent
Deppe

(10) Patent No.: US 6,509,702 B1
(45) Date of Patent: Jan. 21, 2003

(54) METHOD FOR CORRECTION OF TEMPERATURE INDUCED FOCUS ERRORS IN A HEAD-UP DISPLAY UNIT BY MEASURING COEFFICIENTS OF THERMAL EXPANSION

(75) Inventor: James Deppe, Naperville, IL (US)

(73) Assignee: Flight Visions, Inc., Sugar Grove, IL (US)

( * ) Notice: Subject to any disclaimer, the term of this patent is extended or adjusted under 35 U.S.C. 154(b) by 0 days.

(21) Appl. No.: 09/683,005

(22) Filed: Nov. 8, 2001

(51) Int. Cl.[7] ............................................. H01J 29/58
(52) U.S. Cl. ............................ 315/382; 345/7; 359/13; 359/19
(58) Field of Search ............................... 315/382, 379; 345/7; 359/13, 19

(56) References Cited

U.S. PATENT DOCUMENTS

| | | | |
|---|---|---|---|
| 3,205,303 A | 9/1965 | Bradley | 350/174 |
| 3,291,906 A | 12/1966 | Ward et al. | 350/174 |
| 3,666,887 A | 5/1972 | Freeman | 350/174 |
| 4,647,967 A | 3/1987 | Kirschner et al. | 358/109 |
| 4,655,540 A | 4/1987 | Wood et al. | 350/174 |
| 4,669,810 A | 6/1987 | Wood | 350/174 |
| 4,763,990 A | 8/1988 | Wood | 350/174 |
| 4,775,218 A | 10/1988 | Wood et al. | 350/174 |
| 4,868,652 A | 9/1989 | Nutton | 358/113 |
| 5,007,711 A | 4/1991 | Wood et al. | 350/174 |
| 5,134,520 A | 7/1992 | Yamamura | 359/630 |
| 5,204,666 A | 4/1993 | Aoki et al. | 340/705 |
| 5,313,292 A | 5/1994 | Wood et al. | 359/13 |
| 5,379,132 A * | 1/1995 | Kuwayama et al. | 345/7 |
| 5,381,267 A | 1/1995 | Woody | 359/652 |
| 5,394,203 A | 2/1995 | Murphy et al. | 353/13 |
| 5,453,854 A | 9/1995 | Gerbe | 359/13 |
| 5,479,294 A | 12/1995 | Darrieux et al. | 359/630 |
| 5,710,668 A | 1/1998 | Gohman et al. | 359/634 |
| 5,713,666 A * | 2/1998 | Seelin et al. | 374/121 |
| 5,805,119 A | 9/1998 | Erskine et al. | 345/7 |
| 6,072,444 A | 6/2000 | Burns | 345/7 |
| 6,107,943 A | 8/2000 | Schroeder | 340/945 |

* cited by examiner

Primary Examiner—Don Wong
Assistant Examiner—Thuy Vinh Tran
(74) Attorney, Agent, or Firm—Bullwinkel Partners, Ltd.

(57) ABSTRACT

A method of compensating for and correcting temperature induced focus and distortional errors within a head-up display unit is described. The head-up display is comprised of a cathode ray tube and a plurality of lenses constructed of a plastic material defining a lens train and a mounting device constructed of a metal material. The compensation for the temperature can be accomplished by measuring the difference in thermal expansion between the plastic material and the metal material and conveying the measured difference to an alignment device for an appropriate adjustment.

11 Claims, 1 Drawing Sheet

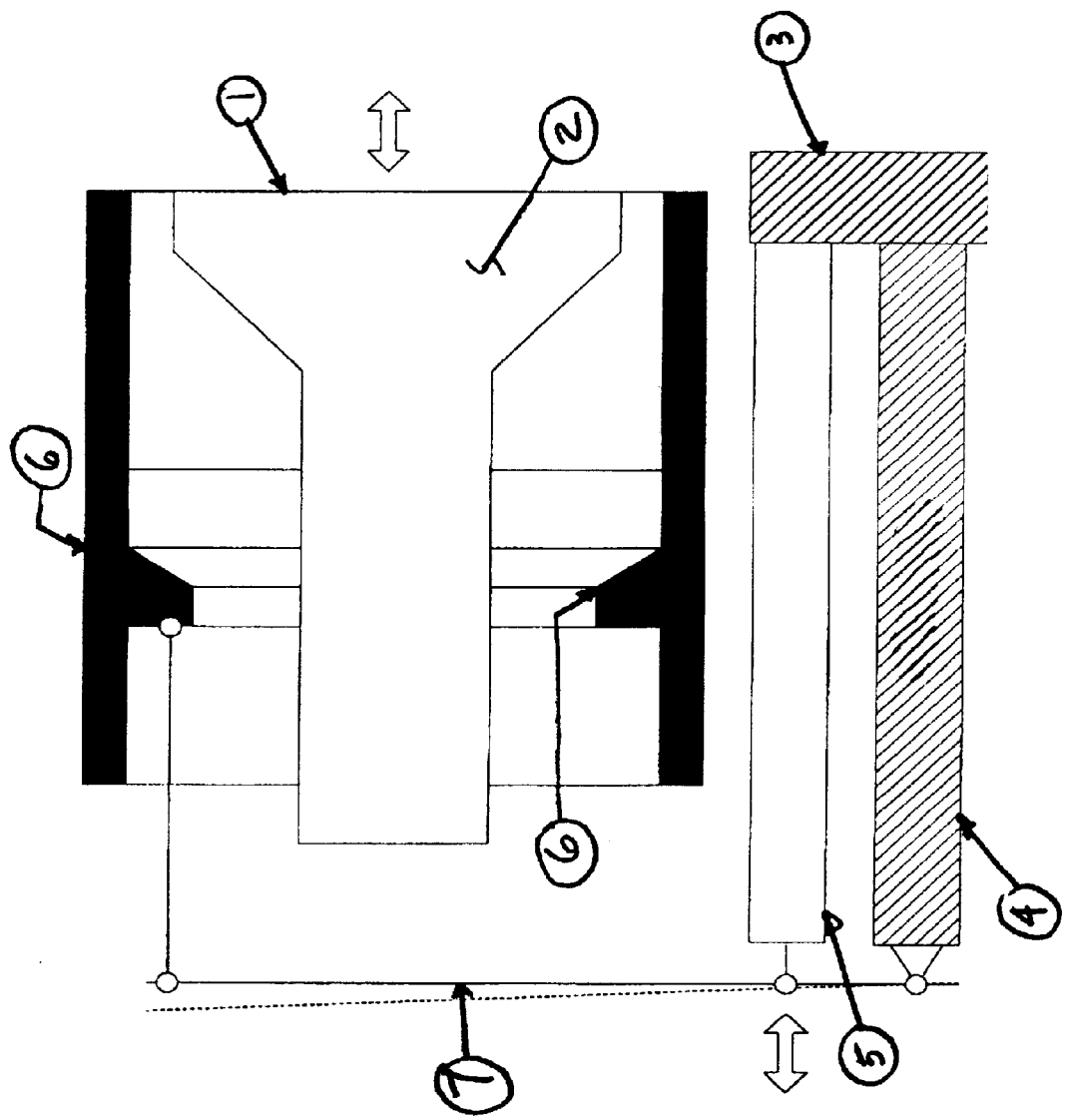

METHOD FOR CORRECTION OF TEMPERATURE INDUCED FOCUS ERRORS IN A HEAD-UP DISPLAY UNIT BY MEASURING COEFFICIENTS OF THERMAL EXPANSION

CROSS REFERENCE TO RELATED APPLICATIONS

The present invention is related to my copending patent applications Ser. No. 09/683,006, filed Nov. 8, 2001 and Ser. No. 09/683,009, filed Nov. 8, 2001, both of which are commonly assigned as the present invention and are incorporated herein by reference.

BACKGROUND OF INVENTION

The present invention relates generally to the correction of focus and distortional errors inherent with conventional head-up display units. More specifically, the present invention relates to a method to correct temperature induced focus and distortion errors in a head-up display unit attributable to plastic lens trains and conventional cathode ray tube electron beam designs.

Ever since the early days of vehicle pioneering, there has always been an inherent danger when an operator of a vehicle, such as a pilot of an aircraft or driver of an automobile, must look down from his outward line of site to view important operative status concerning his vehicle. Such status information is normally presented via analog means such as dials, gauges, or gyroscopes, or digital means such as computer readouts, on a readout display, such as an automobile dashboard or pilot's information panel. The operative status may include information such as fuel, speed, direction, orientation, weapons status, and the like.

As such, when the vehicle operator temporarily looks to the vehicle information display to gather this important information, his outward line of sight is momentarily disrupted. This has inherent dangers, especially in fast moving vehicles such as aircraft and the like. Furthermore, once a vehicle operator is finished gathering the pertinent information, which may take a fraction of a second or sometimes minutes, he must then return to his original line of sight and his focus must readjust. These continual visual diversions relates to problems such as tunnel vision and focus impairment.

It should be noted, however, that the disclosure herein will concentrate on aircraft head-up display devices and enhancements. However, the present invention is applicable to not only aircraft, but also any type of vehicle which may incorporate the usage of a head-up display. As such, the description and emphasis of the present invention's usability within an aircraft should not be deemed limiting, but rather an explanation and exemplification of the present invention.

U.S. Pat. No. 3,205,303, to Bradley, issued on Sep. 7, 1965 ('303 patent) attempts to remedy these problems by inventing a remotely controlled remote viewing system. The '303 patent is one of the first so-called "head-up display" (HUD) units which allows a vehicle operator to receive pertinent vehicle information within his outward line of sight. As such, the vehicle operator does not have to continuously look down to the information display panel to view this information.

There have subsequently been many enhancements and improvements to the '303 patent. For example, U.S. Pat. No. 3,291,906 to Ward et al., issued on Dec. 13, 1996, discloses aircraft visual indicating or display systems utilizing a cathode ray tube; U.S. Pat. No. 3,666,887, to Freeman, issued on May 30, 1972, discloses a head-up display; U.S. Pat. No. 4,763,990, to Wood, issued on Aug. 16, 1988, discloses a head-up display system; U.S. Pat. No. 5,007,711, to Wood et al., issued on Apr. 16, 1991, discloses a compact arrangement for head-up display components; U.S. Pat. No. 5,805,119, to Erskine et al., issued on Sep. 8, 1998, discloses a vehicle projected display using a deformable mirror device; and U.S. Pat. No. 5,379,132, to Kuwayama et al., issued on Jan. 3, 1995, discloses a display apparatus for a head-up display system.

The HUD has subsequently become an important component of the instrumentation in high performance aircraft of all types, from tactical fighter aircraft to large commercial transports. By projecting into the pilot's view an accurate and properly aligned real-time representation of the aircraft's orientation and environment, the pilot is enabled to control an aircraft more efficiently and effectively through the transition from visual orientation to instrument orientation and back again, while having at all times an accurate representation, either digital, analog or both, of all major flight instruments and weapons systems controls.

However, inherent with the pertinent information that a HUD displays, a clear, accurate, and precise information projection to the pilot is tantamount. As such, temperature induced errors must be kept to an absolute minimum in order to make the HUD effective. Visualization errors and distortion cannot be tolerated in these finely tuned assemblies. However, inherent with a HUD's use, constant temperature variations and distortions associated therewith are omnipresent and methods and processes of combating these problems are continuous.

The main component of any conventional HUD is its optics. The optics is the assembly which conveys and magnifies the information in a viewable display to the pilot. Some HUD assemblies utilize a lens train (assembly of lenses within an optical alignment) of conventional glass lenses. However, this process has many limitations.

For example, glass lenses are more susceptible to misalignment due to their weight and subsequent focal sag, can be easily damaged or cracked due to extreme temperature and vibrational variables, and are extremely expensive both to produce and maintain.

However, modern computer-designed aspheric plastic lenses have fewer elements than comparable glass lenses and are much lighter and smaller as well, making the lens train much shorter, less complex and more manageable when compared to conventional glass. These aspheric plastic lenses are conventionally made by molding or turning a plastic blank with diamond tooling followed by fine polishing.

Nevertheless, a limitation with all plastic lenses is that they have relatively higher coefficients of thermal expansion compared to glass, and therefore must be corrected for expected projection errors, due to the continuous variations in temperature encountered in an operating aircraft environment. Because of the previously mentioned need for precise and accurate positioning of information in a HUD, it is thus necessary to correct for distortion of the image caused by the cathode ray tube (CRT) electron beam used in conjunction with the lens train.

The present invention overcomes the disadvantages and/or shortcomings of known prior HUD alignment and distortion correction methods and apparatus and provides significant improvements thereover.

SUMMARY OF INVENTION

The present invention solves the problem of compensating for back focal length changes in the conventional lens systems within a head-up display due to continuous and inherent temperature changes in the aircraft operating environment. The present invention accomplishes this by mechanically measuring and generating an error correction input based upon the differential coefficients of thermal expansion (Δα) between the metallic mounting components of the HUD and the HUD's plastic lens train assembly and subsequently relaying this information to a control means which can alter the CRT position.

BRIEF DESCRIPTION OF DRAWINGS

The preferred embodiment is herein described in detail with references to the drawing, where appropriate, wherein:

FIGURE is a schematic representation of the mechanical temperature compensative focus error correction device of the present invention.

DETAILED DESCRIPTION

As mentioned above, the present invention solves the problem of compensating for changes in the CRT electron beam focal location due to continuous temperature variations in the aircraft operating environment by mechanically generating an error correction input based on the differential coefficients of thermal expansion between the metallic mounting components of the HUD and its associated plastic lens train.

The conventional manner of correcting focal errors is to add corrective lens elements to the lens train, much like color correction is corrected by adding elements of different indices of refraction so that the total error across the visible color spectrum is effectively neutralized. This process not only increases the cumulative size of the lens train, but also re-introduces the need for glass elements and complicates the alignment procedure. Instead, the present invention corrects temperature-induced focus errors mechanically by utilizing the differential in thermal expansion coefficients between the plastic lens train and its metal mounting structure to correct for variations in temperature in the real-world aircraft operating environment.

Referring to FIGURE, which is a simplified schematic depiction of the operation of the preferred embodiment of the present invention, there are at least two differing materials, preferably a metal 4 and a plastic 5, fixedly mounted to a mounting surface 3. It is well known in material mechanics that plastics will generally have a greater thermal expansion coefficient (α) compared to metals. Thus, the preferred embodiment of the present invention utilizes the differential of this physical characteristic to automatically and optimally perform cathode ray tube 2 alignment and adjustments. The preferred embodiment of the present invention can utilize any type of metals with relatively low malleability, and plastics, but preferably aluminum, due to its brittleness and low malleability characteristics, and hard polymer plastics are used. As depicted, the metal 4 represents the lens train assembly mounting means and the plastic 5 represents the plastic lens elements within the lens train. The lens train assembly is fixedly attached to the mounting means which in turn is attached to a mounting surface.

Since both the metal 4 and plastic 5 are mounted to the same mounting plane 3, the plastic 5 will naturally expand and contract much greater than the metal 4 due to its physically greater thermal expansion coefficient. When expansion occurs, a differential thermal expansion measurement means 7 measures the difference in thermal expansion between the metal 4 and plastic 5, which varies depending upon the surrounding operating temperature of the present invention.

The differential thermal expansion measurement means 7 is preferably connected to an alignment means 6, which is connected to the cathode ray tube 2. In the preferred embodiment of the present, the alignment means 6 is a means to reposition the CRT. Alternatively, the alignment means can be an independent alignment or adjusting device, such as a voltage manipulation device, software or hardware alignment device, and the like. Still alternatively, the present invention can use a means to reposition the CRT in unison with at least one individual lens element located within the lens train relative to the remaining lens elements. Further alternatively, the present invention's alignment means can move at least one lens within the lens train relative to the remaining lenses and without moving the CRT position. Also alternatively, the present invention's alignment means can move the entire lens assembly relative to the CRT position in order to perfect the display image. As such, depending upon the difference of thermal expansion, the differential thermal expansion measurement means 7 can automatically adjust the CRT 2 position relative to the HUD lens train, as needed, with the alignment means 6 in order to properly focus the display image reflected from the viewing plane 1. For example, when the operating environment is quite cold, the plastic 5 will contract more than the metal 4 due to its thermal expansion coefficient. The thermal expansion measurement means 7 can subsequently detect this temperature flux due to the changed contraction characteristics of the plastic 5 compared to the metal 4 and apply the needed adjustment. Preferably, the alignment means using a means to move the position of the CRT display.

The foregoing specification describes only the preferred and alternate embodiments of the invention as shown. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed.

What is claimed is:

1. A method of detecting and compensating for temperature induced deflection and focus errors within an operational head-up display unit, said head-up display unit comprising a cathode ray tube and a plurality of lenses constructed of a plastic material defining a lens train, said lens train having a mounting means constructed of a metal material, said method comprising the steps of:

fixedly attaching said lens train to said mounting means;

fixedly attaching said mounting means to a mounting surface;

measuring the difference in thermal expansion between said plastic material and said metal material with a detecting means while said head-up display unit is operational;

conveying said difference in thermal expansion to an alignment means; and compensating for said difference in thermal expansion by applying an adjustment to said alignment means.

2. A method as claimed in claim 1 wherein said plastic material is selected from a group consisting essentially of hard polymer materials.

3. A method as claimed in claim 1 wherein said metal material is selected from a group consisting essentially of metals with relatively low malleability.

4. A method as claimed in claim 3 wherein said metal with relatively low malleability is aluminum.

5. A method as claimed in claim 1 wherein said alignment means is a means to move said cathode ray tube relative to said lens train.

6. A method as claimed in claim 1 wherein said alignment means is a means to move said cathode ray tube concurrent with at least one lens within said lens train relative to the remaining lenses in said lens train.

7. A method as claimed in claim 1 wherein said alignment means is a means to move at least one lens within said lens train relative to the remaining lenses in said lens train.

8. A method as claimed in claim 1 wherein said alignment means is a means to move said lens train relative to said cathode ray tube.

9. A method as claimed in claim 1 wherein said alignment means is a voltage manipulation device attached to said cathode ray tube.

10. A method as claimed in claim 1 wherein said alignment means is a hardware display manipulation device.

11. A method as claimed in claim 1 wherein said alignment means is a software display manipulation device.

\* \* \* \* \*